United States Patent [19]
Janitsch

[11] 4,067,439
[45] Jan. 10, 1978

[54] CURVED-PATH BELT CONVEYOR

[75] Inventor: Anthony D. Janitsch, Belleville, Canada

[73] Assignee: Allis-Chalmers Canada, Limited, Milwaukee, Wis.

[21] Appl. No.: 755,154

[22] Filed: Dec. 29, 1976

Related U.S. Application Data

[63] Continuation-in-part of Ser. No. 687,397, May 17, 1976, abandoned.

[51] Int. Cl.² .............................................. B65G 23/12
[52] U.S. Cl. .................................... 198/835; 198/831
[58] Field of Search ................ 198/825, 831, 835, 837, 198/842

[56] References Cited
U.S. PATENT DOCUMENTS

| | | | |
|---|---|---|---|
| 1,254,941 | 1/1918 | Snow | 198/831 |
| 2,633,975 | 4/1953 | Koerber | 198/831 |
| 2,759,596 | 8/1956 | Keller | 198/835 |
| 3,300,023 | 1/1967 | Creutzmann et al. | 198/825 |
| 3,550,535 | 12/1970 | Rooklyn | 198/837 |
| 3,763,993 | 10/1973 | Whikehart et al. | 198/835 |
| 3,773,167 | 11/1973 | McGinnis | 198/835 |
| 3,856,133 | 12/1974 | Dyachkov | 198/825 |
| 3,869,574 | 3/1975 | Kume | 198/837 |
| 3,901,379 | 8/1975 | Bruhm | 198/831 |
| 4,024,949 | 5/1977 | Kleysteuber et al. | 198/831 |

Primary Examiner—John J. Love
Assistant Examiner—Richard K. Thomson
Attorney, Agent, or Firm—Charles L. Schwab

[57] ABSTRACT

An endless belt conveyor including straight path and curved path sections for the carrying and return runs of the belt. The carrying and return runs of the belt are supported on a support frame by troughing and support idlers. In one version of the invention, the carrying and return runs of the belt are caused to follow a predetermined curve through the curved path section of the conveyor by powered edge drive rolls on the outside edges of the belt runs having a speed which is greater than the belt speed thereby causing the edge of the belt on the outside of the curve to be stretched relative to its condition in the straight path section. In a second version of the invention edge drive rolls are also used on the edges of the belt runs at the inside of the curve. In the latter construction, the peripheral speed of the drive rolls at the inside of the curve is less than belt speed in the straight path section whereby the inner edge is compressed or stretched to a lesser extent than in the straight path section. In the second version of the invention, the difference in peripheral speeds of the inside and outside edge rollers determines the curvature of the belt in the curved path section of the conveyor.

10 Claims, 5 Drawing Figures

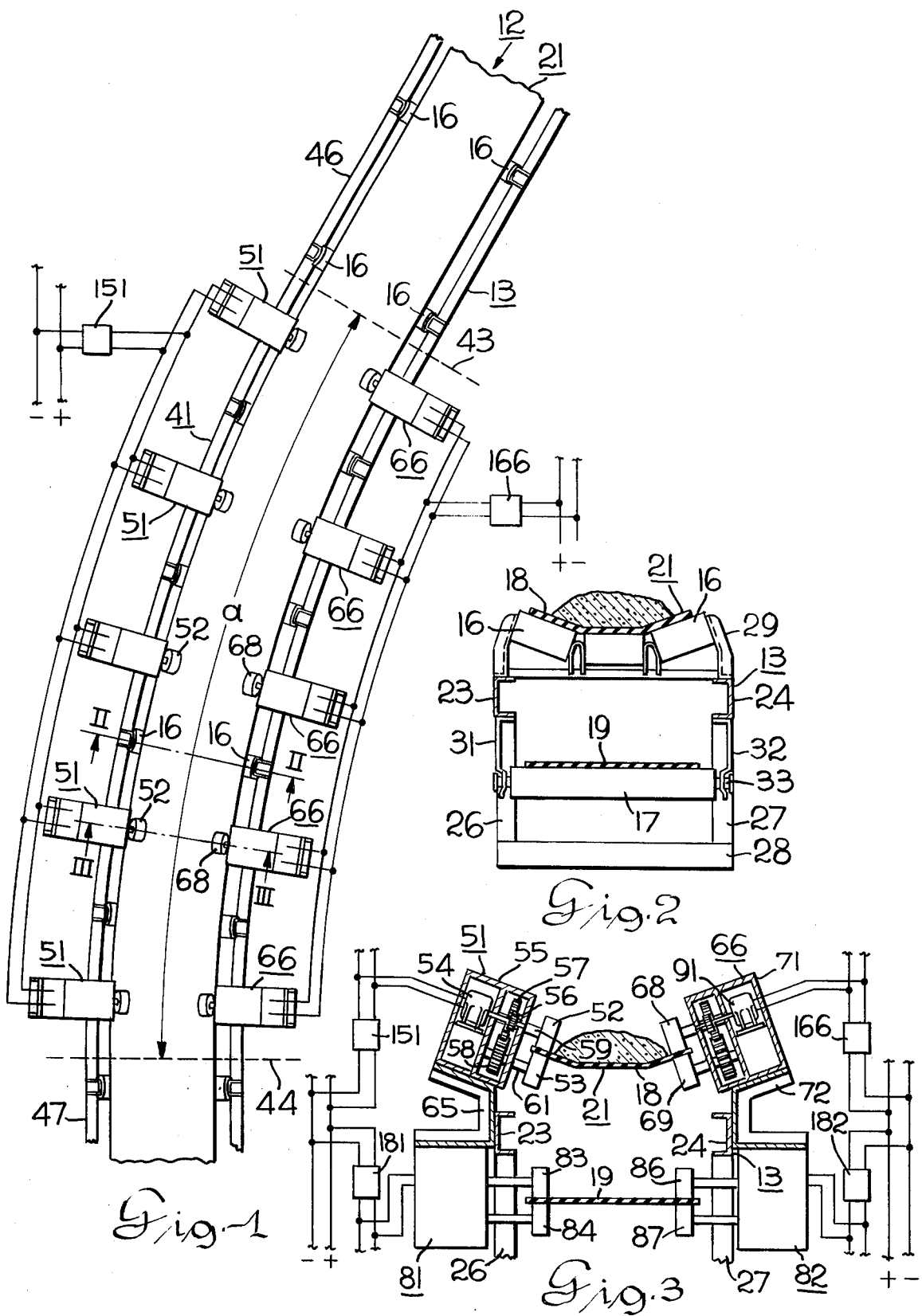

CURVED-PATH BELT CONVEYOR

RELATED APPLICATIONS

This application is a continuation-in-part of my U.S. patent application Ser. No. 687,397, filed May 17, 1976 for Curved-Path Belt Conveyor now abandoned.

BACKGROUND OF THE INVENTION

An endless belt conveyor driven by edge rollers is shown in U.S. Pat. No. 2,759,596. In the before-mentioned prior art patent, upper and lower edge rollers bear on the top and bottom of the carrying run of the endless belt and are positively driven at the same speed. In U.S. Pat. No. 3,856,133 an endless belt conveyor is disclosed having a path which includes rectilinear and curvilinear sections in a horizontal plane. U.S. Pat. Nos. 3,763,993 and 3,773,167 show drives for long-distance conveyor belts wherein driving wheels frictionally engage the marginal drive edges of endless conveyor belts.

BRIEF DESCRIPTION OF THE INVENTION

A troughed long-distance endless belt conveyor includes a relatively short, curved section wherein both the carrying and return runs of the belt have opposed belt-edge drive rolls in pinching, driving relation to at least the outer edges of the belt. The drive rolls on the outer edges of the curved belt section are driven at a speed to produce a peripheral speed which is higher than the speed of the belt in the straight section of the conveyor thereby causing the belt to curve. In the embodiment of the invention wherein edge rolls are used on the belt edges on the inside of the curve such rolls are driven at a speed to produce a peripheral speed which is less than the speed of the belt in the straight section of the conveyor. The edge rolls on the outside of the curve will stretch the edge of the belt relative to its condition in the straight section of the conveyor whereas the edge rolls on the inside of the curve will drive the inside edge of the belt at a slower speed than the outside edge. The differential in peripheral speed of the inside and outside rolls will cause the belt to curve.

BRIEF DESCRIPTION OF THE DRAWINGS

The present invention is illustrated in the drawings in which:

FIG. 1 is a top view of a portion of a long-distance endless belt conveyor in which one embodiment of the present invention is incorporated;

FIG. 2 is a section taken along the line II—II in FIG. 1 showing troughing and support idlers for the carrying and return runs of the belt;

FIG. 3 is a section taken along the line III—III in FIG. 1 showing the edge rolls driving the carrying and return runs of the belt in the curved path section of the conveyor;

DETAILED DESCRIPTION OF THE INVENTION

Figures 4, 5:
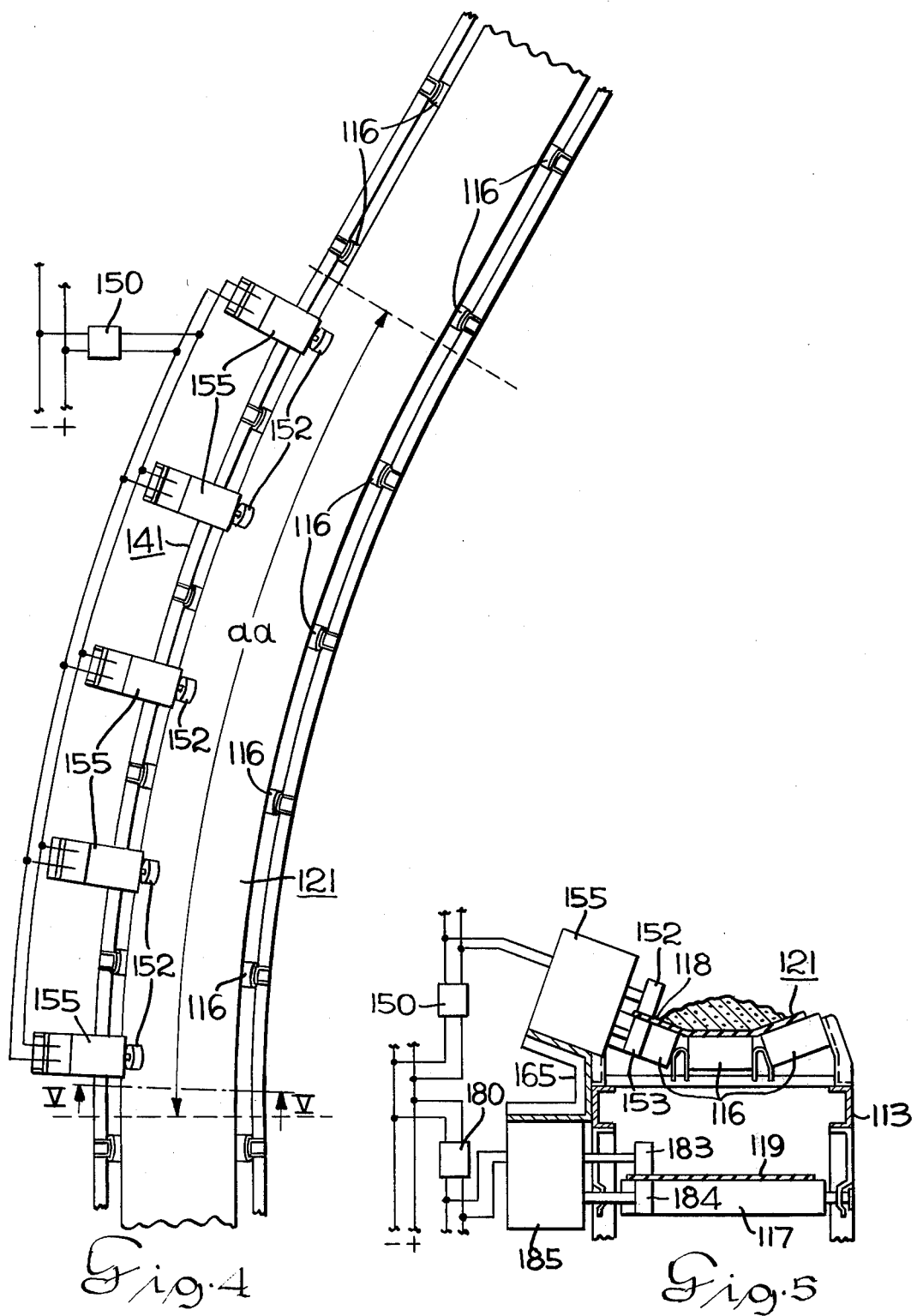
FIG. 4 is a top view of a conveyor incorporating a second embodiment of the present invention.
FIG. 5 is a section taken along the line V—V in FIG. 4.

Referring to FIGS. 1, 2 and 3 of the drawings, a long-distance conveyor 12 includes a support structure 13 on which troughing idlers 16 and return support idlers 17 are rotatably mounted in supporting relation to the carrying run 18 and return run 19 of an endless belt 21. The support structure includes a pair of longitudinally extending parallel channels 23 and 24 supported on upstanding legs 26, 27 rigidly secured to a transverse base 28. The channels 23, 24 support a support frame 29 on which the troughing idlers 16 are rotatably mounted. Brackets 31, 32 are rigidly secured by suitable means, not shown, to the channels 23, 24 in depending relation thereto and their lower ends support a transverse shaft 33 on which the return support idler 17 is rotatably mounted. The long-distance belt conveyor 12 includes a 30 degree curved path section 41 having a radius approximately 14 times the width of the belt 21. Dash lines 43, 44 are drawn at right angles to the straight sections 46, 47 at their junction with the curved section 41 of the endless belt conveyor 12 and the angle $a$ therebetween in the illustrated embodiment of the invention is 30 degrees.

In the curved path section 41 of the endless belt conveyor, the carrying run 18 and the return run 19 are driven by edge or pinch rolls contacting the edges of the belt 21. As shown in FIG. 3, a drive assembly 51 for the edge of the carrying run of the belt at the outside of the curve includes an upper roll 42 and lower roll 53 between which the edge of the belt on the outside of the curve is pinched. The drive assembly 51 includes a housing 55 mounted on a bracket 65 which in turn is secured to channel 23. The upper and lower pinch rolls 52, 53 are driven in opposite directions of rotation by power means in the form of an electric motor 54 mounted in a housing 55 of the drive assembly. The motor 54 includes a gear 56 on its output shaft in driving relation to an output gear 57 secured for rotation with shaft 59 to which the drive roll 52 is secured. The gear 57 meshes with a gear 58 secured for rotation with a shaft 61 to which the drive roll 53 is secured. A drive assembly 66, as shown in FIG. 3, includes upper and lower drive rolls 68, 69 between which the edge of the belt 21 on the inside of the curve is pinched. The drive assembly 66 includes a housing 71 rigidly secured to a bracket 72 of support structure 13. The construction of the drive assembly 66 is similar to that of drive assembly 51. However, as hereinafter discussed, the rolls 68, 69 are driven at a slower speed than the rolls 52, 53. This is achieved by running the electric motor 91 for drive assembly 66 at a slower speed thereby achieving a lower peripheral speed of the driving surface of the rolls 68, 69. Drive assemblies 81, 82, which are mounted on brackets 65, 72, are provided for the outer and inner edges of the return run of belts 19. The drive assemblies 81, 82 are similar in construction to drive assemblies 51, 66. The drive assembly 81 includes upper and lower edge rolls 83, 84 which pinch and drive the edge of the lower run 19 of the endless belt 21 at the outside of the curve at substantially the same speed as the speed at which the edge of the carrying run at the outside of the curve is driven by rolls 52, 53. The drive assembly 82 includes counter-rotating pinch rolls 86, 87 which rotate at a slower speed than pinch rolls 83, 84 thereby causing the return run to follow a predetermined curve path to maintain it on the support idlers 17 in the curved path section of the conveyor. The pinch rolls 86, 87 are driven at substantially the same speed as the pinch rolls 68, 69 driving the edge of the carrying run of the belt on the inside of the curved path section of the conveyor. As shown, all of the pinch rolls 52, 53, 68, 69, 83, 84, 86, 87 are of the same diameter. Thus, a difference in rotative speed between the rolls will produce a difference in peripheral speed of such rolls.

In the embodiment of the invention illustrated in FIGS. 1, 2 and 3, the support structure 13 includes troughing and support idlers 16, 17 which are mounted at predetermined circumferentially spaced intervals about the curved path section 41. The drive assemblies 51, 66, 81, 82 are also mounted on the curved path section 41 of the support structure 13 at circumferentially spaced intervals and are positioned intermediate the sets of troughing and support idlers. As illustrated, the troughing idlers 16 are directly above the support idlers 17 and the drive assemblies 51, 66 for the carrying run 18 of the belt 21 are directly above the drive assemblies 81, 82, respectively. An adjustable motor speed control 151 is provided for the series of drive assemblies 51 at the outside curve of the carrying run of the belt in the curved path section and likewise adjustable motor speed controls 166, 181, 182 are provided, respectively, for the three series of drive assemblies 66, 81, 82. The motor speed controls 151, 166, 181, 182 are adjustable to permit the roll speed changes to be changed to coordinate with the speed at which the belt is run in the straight path section.

In the event the path of the curved section of the conveyor is not a constant radius curve, it may be desirable to provide separate adjustable motor speed controls for each drive assembly.

It should be understood that the endless belt 21 of the long-distance conveyor is driven by conventional drive means such as drive rollers, not shown, and that the drive assemblies of this invention are additional to the drive means usually associated with long-distance belt conveyors. The illustrated long-distance conveyor is particularly well suited to conveying bulk material such as coal, crushed rock, ore, sand, gravel, and the like. Such granular material is normally deposited on the central part of the belt where it tends to stay because of the troughed condition of the carrying run of the belt. This leaves the edges of the belt free for pinching engagement by the edge drive rolls of the drive assemblies of the present invention. The edge drive rolls 52, 53 drive the edge of the belt on the outside of the curve at a higher speed than the speed at which the edge of the belt on the inside of the curve is driven by edge drive rolls 68, 69. This stretches the edge of the belt at the outside of the curve more than the edge of the belt on the inside of the curve thereby causing the belt to curve in conformity with the curved path section 41. In other words, the differential in peripheral speed of the edge drive rolls at the inner and outer edges of the belt causes the belt to curve so as to maintain a proper supported orientation on top of the troughing and support idlers in the curved path section 41. The drive assemblies 81, 82 similarly cooperate with the return run 19 in the curved path section 41.

Referring to FIGS. 4 and 5, a second embodiment of the invention is illustrated in which only the outer edges of a belt 121 in the curved path section 141 are driven by pinch rolls. More specifically, the upper carrying run 118 of the belt 121 is pinched and driven on the outer edge, through the 30 degree angle $aa$ the curved section 141, by opposed upper and lower edge rolls 152, 153 of a plurality of upper drive assemblies 155. A pair of upper and lower pinch rolls 183, 184 of each of a plurality of lower drive assemblies 185, only one of which is shown, pinch and drive the outer belt edge of the lower return run 119 of the belt 121 in the curved path section 141. The drive assemblies 155, 185 are supported on the support structure 113 by suitable brackets 165 and the speed of the pinch rolls are controlled by controls 150, 180. The troughing idlers 116 and return idlers 117 for the belt 121 are supported on the support structure 113 in the same manner as the troughing idlers 16 and return idlers 17 of the embodiment of the invention shown in FIGS. 1, 2 and 3. Also, the drive assemblies 155, 185 are similar in construction to drive assembly 51.

In some long-distance conveyor installations, it may only be necessary to use pinch rolls on the outside of the curve in the curved section of the conveyor and thus employment of the second embodiment of the invention will save considerable expense over the embodiment of FIGS. 1, 2 and 3. It is believed, however, that for general purpose, outdoor, long distance conveying the embodiment of FIGS. 1, 2 and 3 will provide superior performance in handling bulk material of various types. When pinch rolls are used only on the outside edges of the carrying and return runs of the belt in the curved path section 141, the motor controls 150, 180 will be adjusted to cause the electric motors of the drive assemblies 155, 185 to drive the outside edges at a speed greater than the speed of the belt in a straight section. In other words, the outside edges of the carrying and return runs will move at a greater speed than the inside edges thereof in the curved path section 141 of the conveyor thereby causing the carrying and return runs to follow the predetermined curvature of the curved path section.

The embodiments of the invention in which an exclusive property or privilege is claimed are defined as follows:

1. In an endless-belt conveyor having a belt with a carrying run and a return run supported by troughing idlers and support idlers, respectively, a curved path section including
    a support structure on which at least some of said troughing and support idlers are mounted at predetermined circumferentially spaced intervals,
    a first series of drive assemblies mounted on said support structure and spaced circumferentially from one another along the outside edge of said carrying run of said belt in said curved path section, each of said assemblies including a pair of pinch rolls with peripheries thereof drivingly engaging the upper and lower sides, respectively, of said outside edge of said carrying run of said belt,
    a second series of drive assemblies mounted on said support structure and spaced circumferentially from one another along the inside edge of said carrying run of said belt in said curved path section, each of said assemblies including a pair of pinch rolls with peripheries engaging the upper and lower sides, respectively, of said inside edge of said carrying run of said belt, and
    power means driving said rolls of said assemblies to effect a peripheral speed of said rolls of said first series of assemblies which is greater than the peripheral speed of said rolls of said second series of assemblies whereby the outer edge of the portion of the carrying run of said belt in said curved path section is stretched relative to said inside edge thereby causing said portion to curve about said path section.

2. The conveyor of claim 1 wherein said rolls are of equal diameter and said rolls of said first series of drive assemblies are driven at a higher speed than said rolls of said second series of drive assemblies.

3. The conveyor of claim 1 wherein said power means includes an electric motor operatively associated with each drive assembly and drivingly connected to said rolls thereof.

4. The conveyor of claim 3 and further comprising adjustable motor speed controls operatively associated with said motors, respectively, to establish the peripheral speed of the rolls of said first series of assemblies at a different value than the peripheral speed of the rolls of said second series of assemblies.

5. The conveyor of claim 1 wherein said drive assemblies are positioned at intervals along said curved path section intermediate said troughing idlers.

6. The conveyor of claim 1 and further comprising third and fourth series of drive assemblies mounted on said support structure and operatively associated with the outer and inner edges, respectively, of said return run of said belt in said curved path section, each of said drive assemblies including upper and lower pinch rolls engaging the upper and lower sides, respectively, of the belt edge, power means rotating said rolls of said third and fourth series of assemblies to effect a peripheral speed of the rolls of said third series of assemblies which is greater than the peripheral speed of said rolls of said fourth series of assemblies to effect a stretching of said belt causing it to follow the curve of said curved path section.

7. In an endless-belt conveyor having a belt with a carrying run and a return run supported by troughing idlers and support idlers, respectively, a curved path section including a support structure on which at least some of said troughing and support idlers are mounted at predetermined circumferentially spaced intervals, a series of drive assemblies mounted on said support structure and spaced circumferentially from one another along the outside edge of said carrying run of said belt in said curved path section, each of said assemblies including a pair of pinch rolls with peripheries thereof drivingly engaging the upper and lower sides, respectively, of said outside edges of said carrying run of said belt, and powers means driving said rolls of said assemblies to effect a peripheral speed of said rolls of said series of assemblies which is greater than the peripheral speed of the inside edge of said belt whereby the outer edge of the portion of the carrying run of said belt in said curved path section is stretched relative to said inside edge thereby causing said portion to curve about said curved path section.

8. The conveyor of claim 7 wherein said rolls are of equal diameter wherein said power means includes an electric motor operatively associated with each drive assembly and drivingly connected to said rolls thereof.

9. The conveyor of claim 7 wherein said drive assemblies are positioned at intervals along said curved path section intermediate said troughing idlers.

10. The conveyor of claim 7 and further comprising a second series of drive assemblies mounted on said support structure and operatively associated with the outer edge of said return run of said belt in said curved path section, each of said drive assemblies including upper and lower pinch rolls engaging the upper and lower sides, respectively, of the belt edge, power means rotating said rolls of said second series of assemblies to effect a peripheral speed of the outer edge on part of said return run of said belt in said curved section is stretched relative to said inner edge thereby causing said part to follow the curve of said curved path section.

* * * * *